United States Patent
Ooba et al.

(10) Patent No.: US 9,639,249 B2
(45) Date of Patent: May 2, 2017

(54) ENGINEERING TOOL PROVIDING HUMAN INTERFACE AMONG PLURALITY OF HUMAN INTERFACES ACCORDING TO USER SKILL LEVEL

(71) Applicants: Kunio Ooba, Tokyo (JP); Hiroko Nagamatsu, Tokyo (JP)

(72) Inventors: Kunio Ooba, Tokyo (JP); Hiroko Nagamatsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/769,319

(22) PCT Filed: Mar. 7, 2013

(86) PCT No.: PCT/JP2013/056357
§ 371 (c)(1),
(2) Date: Aug. 20, 2015

(87) PCT Pub. No.: WO2014/136245
PCT Pub. Date: Sep. 12, 2014

(65) Prior Publication Data
US 2015/0378543 A1    Dec. 31, 2015

(51) Int. Cl.
*G06F 3/0482*    (2013.01)
*G06F 3/0484*    (2013.01)
(Continued)

(52) U.S. Cl.
CPC ......... *G06F 3/0484* (2013.01); *G05B 19/056* (2013.01); *G06F 3/048* (2013.01);
(Continued)

(58) Field of Classification Search
CPC .......................... G06F 9/4443; G06F 3/04842
(Continued)

(56) References Cited

U.S. PATENT DOCUMENTS

2008/0294763 A1    11/2008 Uchida
2010/0207897 A1    8/2010 Ono
(Continued)

FOREIGN PATENT DOCUMENTS

JP    10-228493 A    8/1998
JP    2002-278606 A    9/2002
(Continued)

OTHER PUBLICATIONS

JPO Office Action (Notice of Rejection) for Application No. 2013-540163 dated Oct. 22, 2013. English translation.
(Continued)

*Primary Examiner* — Andrey Belousov
(74) *Attorney, Agent, or Firm* — Sughrue Mion, PLLC; Richard C. Turner

(57) ABSTRACT

To provide an engineering tool including a basic processing unit that performs a process of program editing according to an input operation by an input device, and a display processing unit that displays an operation screen for the program editing on a display device. The basic processing unit can accept the input operation by a plurality of input devices, as a plurality of human interfaces, and when a human interface corresponding to a level of operation skill in the input operation is selected from the human interfaces, the basic processing unit performs a process in accordance with the input operation by an input device corresponding to the selected human interface, and the display processing unit displays the operation screen corresponding to the selected human interface on the display device.

9 Claims, 10 Drawing Sheets

(51) Int. Cl.
*G06F 3/048* (2013.01)
*G05B 19/05* (2006.01)
(52) U.S. Cl.
CPC .............. *G06F 3/04842* (2013.01); *G05B 2219/13144* (2013.01); *G05B 2219/25084* (2013.01)
(58) Field of Classification Search
USPC ........................................................ 715/745
See application file for complete search history.

(56) References Cited

U.S. PATENT DOCUMENTS

| | | | |
|---|---|---|---|
| 2011/0154216 A1* | 6/2011 | Aritsuka | G06F 9/4443 715/745 |
| 2011/0300934 A1 | 12/2011 | Toy et al. | |
| 2012/0242590 A1 | 9/2012 | Baccichet et al. | |
| 2013/0190083 A1 | 7/2013 | Toy et al. | |
| 2014/0040759 A1 | 2/2014 | Okubo et al. | |
| 2014/0046476 A1 | 2/2014 | Walker et al. | |
| 2014/0229867 A1 | 8/2014 | Suzuki et al. | |
| 2014/0290323 A1 | 10/2014 | Weigmann et al. | |

FOREIGN PATENT DOCUMENTS

| | | |
|---|---|---|
| JP | 2004-62223 A | 2/2004 |
| JP | 2005-202774 A | 7/2005 |
| JP | 2006-231627 A | 9/2006 |
| JP | 2007-304448 A | 11/2007 |
| JP | 2008-287614 A | 11/2008 |
| JP | 2011-96167 A | 5/2011 |
| JP | 2011-128941 A | 6/2011 |
| TW | M436864 U1 | 9/2012 |
| TW | 201250418 A | 12/2012 |
| TW | 201303706 A | 1/2013 |
| WO | 2009/054478 A1 | 4/2009 |
| WO | 2012/144139 A1 | 10/2012 |
| WO | 2012/144140 A1 | 10/2012 |

OTHER PUBLICATIONS

JPO Office Action (Notice of Final Rejection) for Application No. 2013-540163 dated Jan. 30, 2014. English translation.
Two Office Action (Examination Report from the Intellectual Property Office) for Application No. 102127742 dated Nov. 28, 2014. English translation.
International Search Report for PCT/JP2013/056357 dated Jun. 11, 2013 [PCT/ISA/210].
Written Opinion for PCT/JP2013/056357 dated Jun. 11, 2013 [PCT/ISA/237].
Communication dated Dec. 6, 2016, from the Korean Intellectual Property Office in counterpart Korean application No. 10-2015-7027283.
Communication dated Jan. 25, 2017, from the State Intellectual Property Office of the P.R.C. in counterpart application No. 201380074153.4.

\* cited by examiner

FIG.7
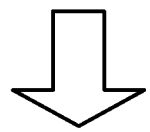
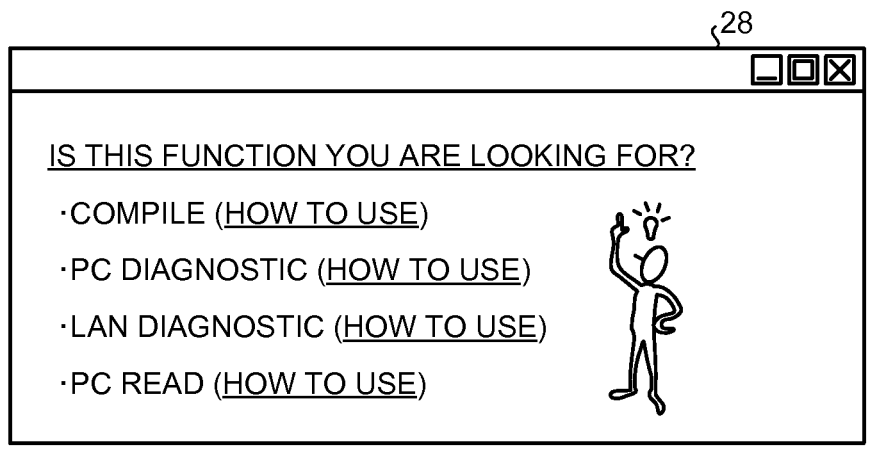

ENGINEERING TOOL PROVIDING HUMAN INTERFACE AMONG PLURALITY OF HUMAN INTERFACES ACCORDING TO USER SKILL LEVEL

CROSS REFERENCE TO RELATED APPLICATIONS

This application is a National Stage of International Application No. PCT/JP2013/056357, filed on Mar. 7, 2013, the contents of all of which are incorporated herein by reference in their entirety.

FIELD

The present invention relates to an engineering tool, and more particularly to an engineering tool for creating a sequence program.

BACKGROUND

An engineering tool provides a predetermined human interface to a user who creates a sequence program. For example, Patent Literature 1 discloses a programming device that enables customization of environmental setting related to a programming operation according to user's preference.

CITATION LIST

Patent Literature

Patent Literature 1: Japanese Patent Application Laid-open No. 2004-62223

SUMMARY

Technical Problem

Conventionally, an engineering tool provides a standardized interface to all users, regardless of the user's level of operation skill. In this case, an input operation in the engineering tool may be hard to understand for a user who is not accustomed to program editing. Further, the input operation in the engineering tool may be unsatisfactory for a user skilled in program editing due to a low level of the operability with respect to the user's own skill. In this manner, according to the conventional technique, it is difficult for the engineering tool to realize an easily understandable input operation according to the level of operation skill and high operability for users having different levels of operation skill.

As the programming device described in Patent Literature 1, if a user can set the programming environment arbitrarily, a programming environment matched with the user's operation skill may not always be selected. Therefore, even if the programming environment can be set arbitrarily, there are cases in which the input operation is not easily understandable, and the operability is quite unsatisfactory.

The present invention has been achieved in view of the above problems, and an object of the present invention is to provide an engineering tool for users having different level of operation skills, which can satisfy both understandability and high operability according to the level of each user's operation skill.

Solution to Problem

To solve the above problems and achieve the object, an engineering tool including: a basic processing unit that performs a process of program editing according to an input operation by an input device; and a display processing unit that displays an operation screen for the program editing on a display device. The basic processing unit can accept the input operation by a plurality of input devices, as a plurality of human interfaces, and when a human interface corresponding to a level of operation skill in the input operation is selected from the human interfaces, the basic processing unit performs a process in accordance with the input operation by an input device corresponding to the selected human interface, and the display processing unit displays the operation screen corresponding to the selected human interface on the display device.

Advantageous Effects of Invention

According to the present invention, the engineering tool can select any one of a plurality of human interfaces according to the level of a user's operation skill. By enabling a plurality of human interfaces to be provided according to the level of each user's skill, the engineering tool can provide an interface that prioritizes understandability of an input operation, for example, for users with a beginner level. Further, the engineering tool can provide an interface focusing on high operability and working speed, for example, for users with an advanced level. Accordingly, the engineering tool can satisfy both understandability and high operability for users having different level of operation skills according to the level of each user's operation skill.

BRIEF DESCRIPTION OF DRAWINGS

FIG. 7 is a diagram for explaining about an operation support function.

DESCRIPTION OF EMBODIMENTS

Exemplary embodiments of an engineering tool according to the present invention will be explained below in detail with reference to the accompanying drawings. The present invention is not limited to the embodiments.

Embodiment.

Figure 1:
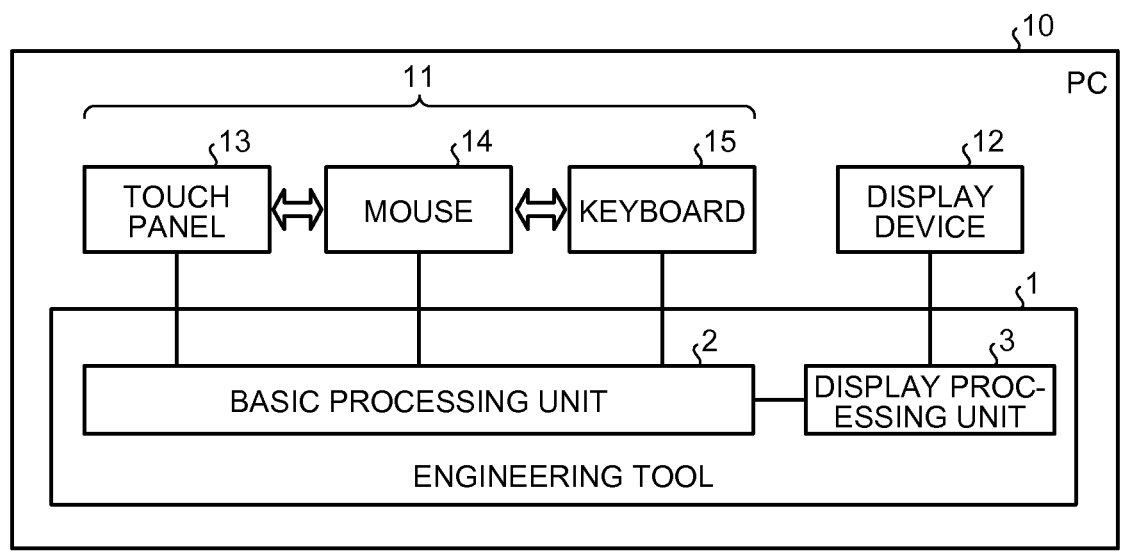
FIG. 1 is a block diagram illustrating a configuration for realizing an operation and a process in an engineering tool according to an embodiment.

FIG. 1 is a block diagram illustrating a configuration for realizing operations and processes in an engineering tool according to an embodiment. An engineering tool 1 is for editing a sequence program which operates in a PLC system or the like. The engineering tool 1 is realized by, for example, a personal computer (PC) 10 in which engineering tool software is installed.

The PC 10 has an input device 11 and a display device 12. The PC 10 includes a plurality of input devices 11 such as, for example, a touch panel 13, a mouse 14, and a keyboard 15. The display device 12 is, for example, a liquid crystal display. The display device 12 displays an operation screen or the like for program editing. The touch panel 13 is arranged on the liquid crystal display.

The engineering tool 1 includes a basic processing unit 2 and a display processing unit 3. The basic processing unit 2 performs a process of program edition in accordance with an input operation by the input device 11. The display processing unit 3 performs a process for displaying contents of program edition by the basic processing unit 2 on the operation screen.

The engineering tool 1 provides a plurality of human interfaces according to the level of operation skill in an input operation. In the present embodiment, the human interface may be referred to as "UI (user interface)" as appropriate.

A plurality of UIs are, for example, a UI mainly composed of the touch panel 13, a UI mainly composed of the mouse 14, and a UI mainly composed of the keyboard 15. The basic processing unit 2 can accept input operations by the touch panel 13, the mouse 14, and the keyboard 15 as a plurality of UIs.

The input operation by the touch panel 13 is performed by touching a touch switch that appears on the operation screen by a finger or the like. Because the touch panel 13 is touched, while visually confirming a display position, the touch panel 13 is known as a panel, by which information can be input relatively easily, and whose operation method is intuitively understandable. The engineering tool 1 provides an UI mainly composed of the touch panel 13 for users with a beginner level.

In the operation screen of the touch panel 13, a touch switch or the like is displayed relatively large, assuming an erroneous operation because of the fact that a touch position of a finger or the like can be a wide range. Therefore, in the case of an input operation by the touch panel 13, an operation of switching over the screen is likely to increase because an amount of information that can be displayed on one screen decreases. Further, various pieces of information for supporting the operation are displayed so that the operation can be advanced according to the display. Accordingly, in the UI mainly composed of the touch panel 13, understandability of the input operation is prioritized so as to be suitable for a case in which a user has poor knowledge of the operation of program editing or is unaccustomed to the operation of program editing. On the other hand, the UI mainly composed of the touch panel 13 is not suitable when an advanced operation focusing on working speed is desired.

By the keyboard 15, various pieces of information can be instantly input by using an appropriately customized shortcut input, a command input, or the like. By the keyboard 15, a high-speed input operation is made possible by utilizing various key inputs. The engineering tool 1 provides the UI mainly composed of the keyboard 15 for users with an advanced level.

In the case of an input operation by use of the keyboard 15, a user is required to have advanced knowledge of the program editing operation or to be accustomed to the program editing operation. The UI mainly composed of the keyboard 15 is suitable when the advanced operation focusing on the working speed is desired. On the other hand, the UI mainly composed of the keyboard 15 is not suitable when a user has poor knowledge of the program editing operation or is not accustomed to the program editing operation.

The engineering tool 1 provides the UI mainly composed of a mouse for users with an intermediate level. The engineering tool 1 adopts the UI mainly composed of the mouse 14 as a UI positioned between the UI mainly composed of the touch panel 13 and the UI mainly composed of the keyboard 15, from the viewpoint of understandability and high operability of an input operation.

For example, in an automatic switchover mode, the engineering tool 1 recognizes the input device 11 and can automatically select one of the UIs. In the automatic switchover mode, when the basic processing unit 2 recognizes that one of the input devices 11 including a plurality of UIs is connected to the PC 10 as hardware, the engineering tool 1 switches over the UI according to the connected input device 11. A user can appropriately select one of the input devices 11 to be connected to the hardware according to the level of his operation skill.

For example, in a manual setting mode, the engineering tool 1 enables a user to select any one of the UIs. In the manual setting mode, the display processing unit 3 displays a selection screen that accepts selection of the UI on the display device 12. On the selection screen, explanations of the suitable level of operation skill for each UI, for example, information for beginners, intermediate users, and advanced users, are displayed. The user can appropriately select the UI on the selection screen according to the level of his own operation skill.

When the UI is selected in each of the modes, the basic processing unit 2 performs a process according to the input operation by the input device 11 corresponding to the selected UI. The display processing unit 3 displays the operation screen according to the selected UI on the display device 12.

Figure 2:
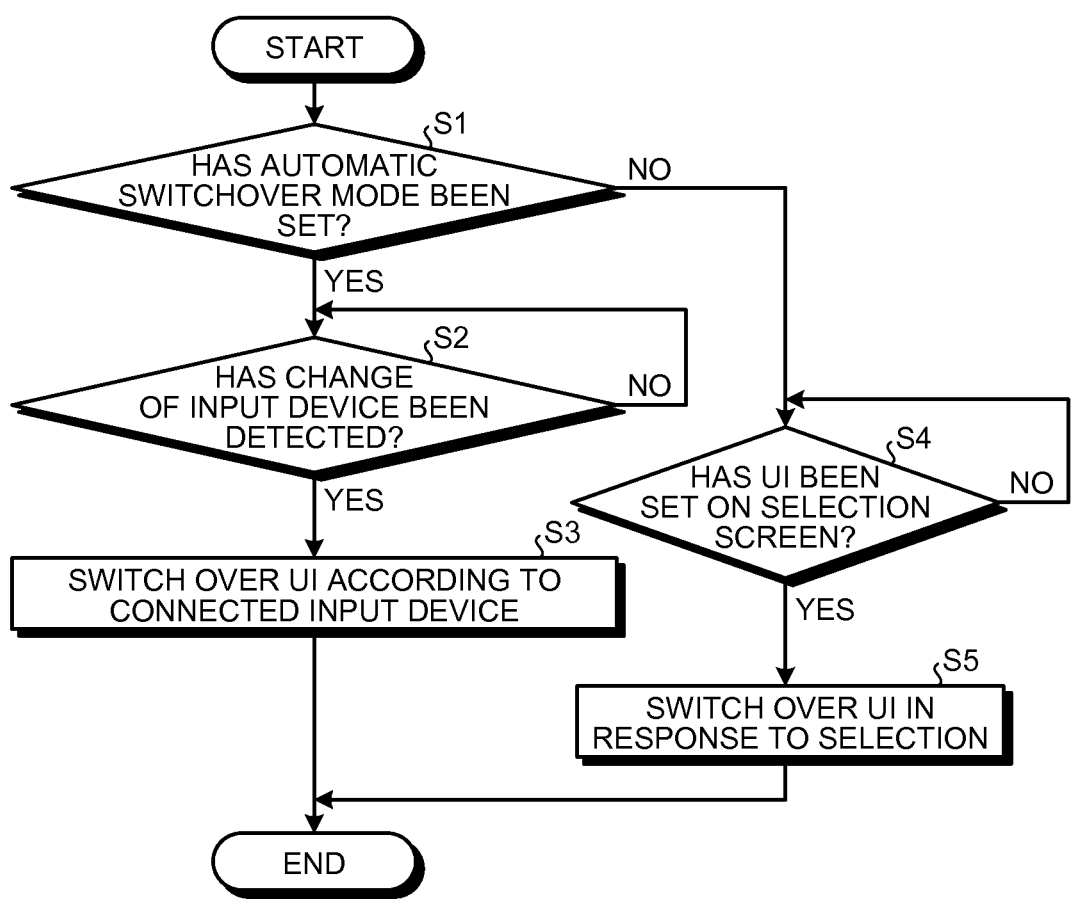
FIG. 2 is a flowchart for explaining about switchover of a human interface performed by the engineering tool.

FIG. 2 is a flowchart for explaining about the switchover of a human interface performed by the engineering tool. The basic processing unit 2 determines whether or not the automatic switchover mode has been set (Step S1).

If the automatic switchover mode has been set (YES at Step S1), it is assumed that one of the input devices 11 is connected to the PC 10. Upon the connection of the input device 11, the basic processing unit 2 detects that there is a change of the input device 11 (YES at Step S2). It should be noted that if the engineering tool 1 is installed in hardware mounted with a touch panel 13 such as a tablet terminal, the engineering tool 1 automatically recognizes that the input device 11 is the touch panel 13. If the basic processing unit 2 does not detect a change of the input device 11 (NO at Step S2), the basic processing unit 2 waits until the change of the input device 11 is detected.

The engineering tool 1 switches over the UI according to the input device 11 connected to the PC 10 (Step S3). Accordingly, the engineering tool 1 finishes the operation for switching over the UI.

If the automatic switchover mode has not been set (NO at Step S1), the basic processing unit 2 recognizes that a manual setting mode is set. A user selects any one of the UIs according to the selection screen on the display device 12.

If the user sets the UI (YES at Step S4), the engineering tool 1 switches over the UI in response to the selection on the selection screen (Step S5). If there is no setting of UI on the selection screen (NO at Step S4), the engineering tool 1 holds the previous UI until a new UI is selected on the selection screen. Accordingly, the engineering tool 1 finishes the operation for switching over the UI.

It is assumed that, in the engineering tool 1, the input device 11 to be used does not need to be specified completely, for example, by dividing into the touch panel 13 as an UI for the beginner level, the mouse 14 as an UI for the intermediate level, and the keyboard 15 as an UI for the advanced level. In each UI, it is adequate if each of the touch panel 13, the mouse 14, and the keyboard 15 is set as a main device of the input device 11, and it is assumed that the touch panel 13, the mouse 14, and the keyboard 15 can be appropriately combined and used.

Figure 3:
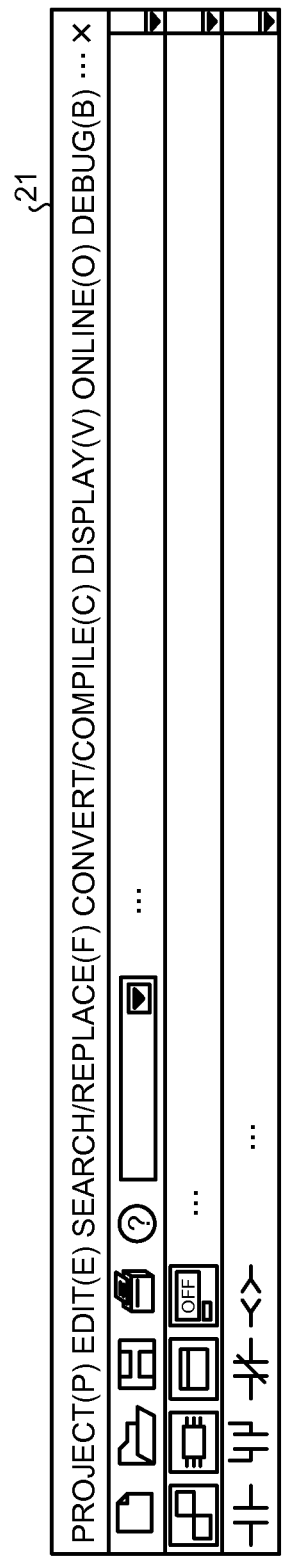
FIG. 3 is a diagram illustrating an example of an operation screen when a mouse is used.
Figure 4:
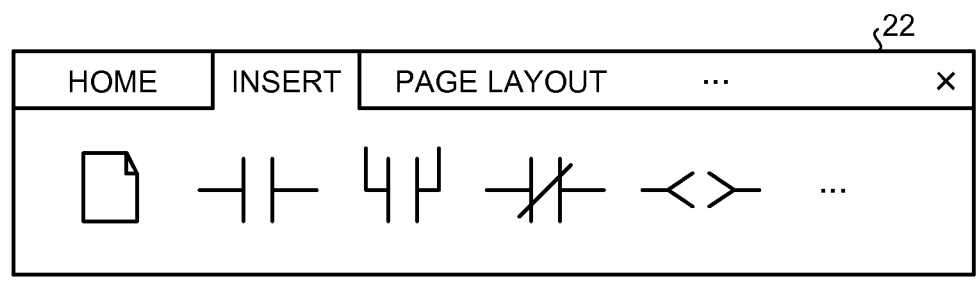
FIG. 4 is a diagram illustrating an example of an operation screen when a touch panel is used.

Specific examples of the input operation and the operation screen in each UI are described next with reference to FIGS. 3 to 7. FIG. 3 is a diagram illustrating an example of an operation screen when a mouse is used. FIG. 4 is a diagram illustrating an example of an operation screen when a touch panel is used.

FIG. 3 illustrates an example of a ribbon display on a mouse operation screen 21. The ribbon display includes a menu bar for file operations, icons for various editing operations, and the like. Parts such as a menu and the icons have an identifiable size by a mouse pointer, for example, the same size as that of a menu bar and icons displayed on the screen by normal software for word processing.

FIG. 4 illustrates an example of a ribbon display on a touch-panel operation screen 22. Because a touch point by a finger is likely to be a wide range, the parts such as the menu and the icons are made in a larger size than that in the case of mouse operation screen 21. As the size of each part increases, the number of parts that can be displayed on the screen at the same time decreases. Therefore, in the touch-panel operation screen 22, actions such as switching over the display by selecting a tab and opening a dialogue are frequently used.

Figure 5:
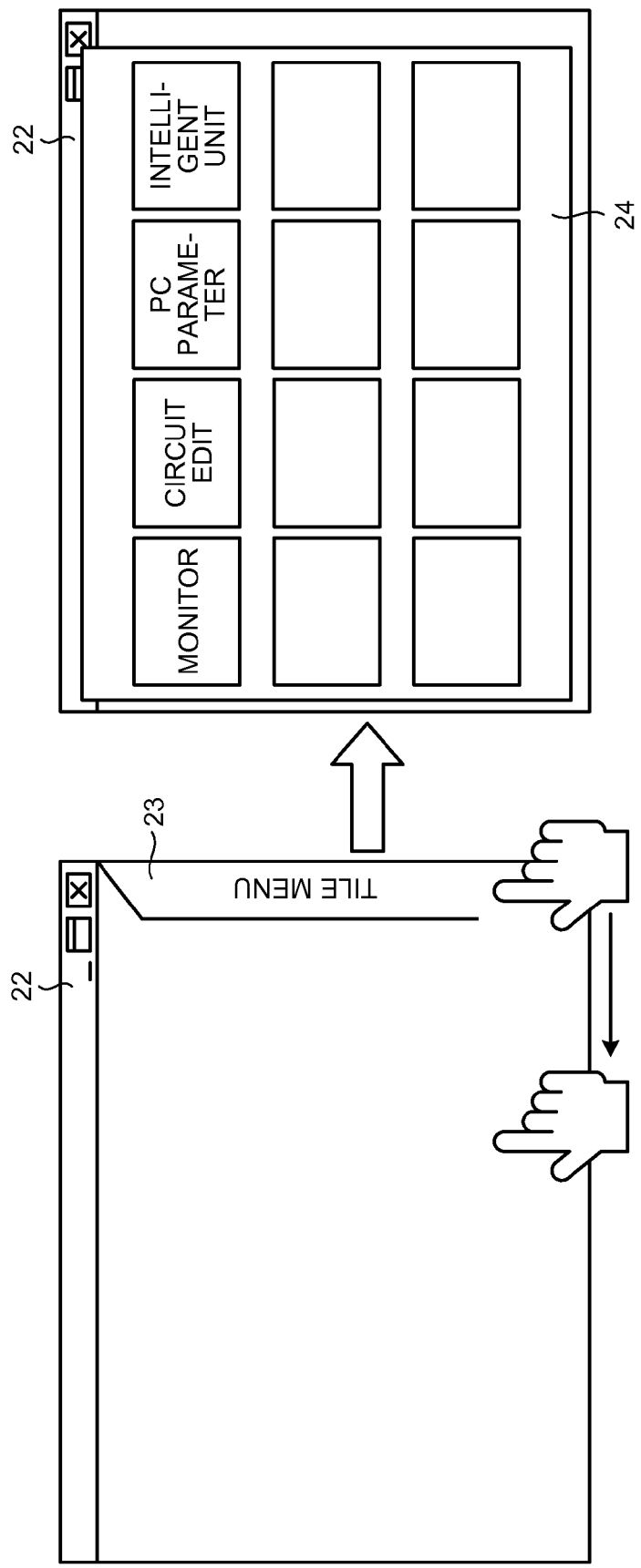
FIG. 5 is a diagram for explaining about indication of a tile menu.

FIG. 5 is a diagram for explaining about the indication of tile menu. A tile menu 24 is suitable mainly for the touch-panel operation screen 22 for beginners. For example, if a tab 23 displayed at a right end on the touch-panel operation screen 22 is slid to the left side while holding the touch on the tab 23, the tile menu 24 is displayed in such a manner as to cover the touch-panel operation screen 22.

In the UI with a beginner level, by preparing various functions of program editing as the tile menu 24, a user can read out each function by a simple operation. The content of the tile menu 24 can be set, for example, by the user. The basic processing unit 2 can be arranged such that it performs ranking of use frequencies of the functions to set the content of the tile menu 24 automatically. Alternatively, the engineering tool 1 may be arranged such that it can select whether the content of the tile menu 24 is set, as a mode for setting, manually or automatically.

In the UI with an advanced level, each of the functions of program editing can be read out by a key input operation through the keyboard 15. For example, the basic processing unit 2 can allocate a keyboard shortcut to each of the functions. The shortcut key can be set arbitrarily, for example, by the user. The user can perform program editing by using the shortcut key, which is easy to remember for the user himself.

For example, the user can arbitrarily set the shortcut key such as <Ctrl (control key)+"M" "0"> for starting a monitor mode, <Ctrl+"N" "E"> for switchover to the next tab, and <Ctrl+"B" "A"> for switching over to the previous tab. Accordingly, the user can freely customize the input operation in the engineering tool 1 so that program editing can be carried out efficiently.

Figure 6:
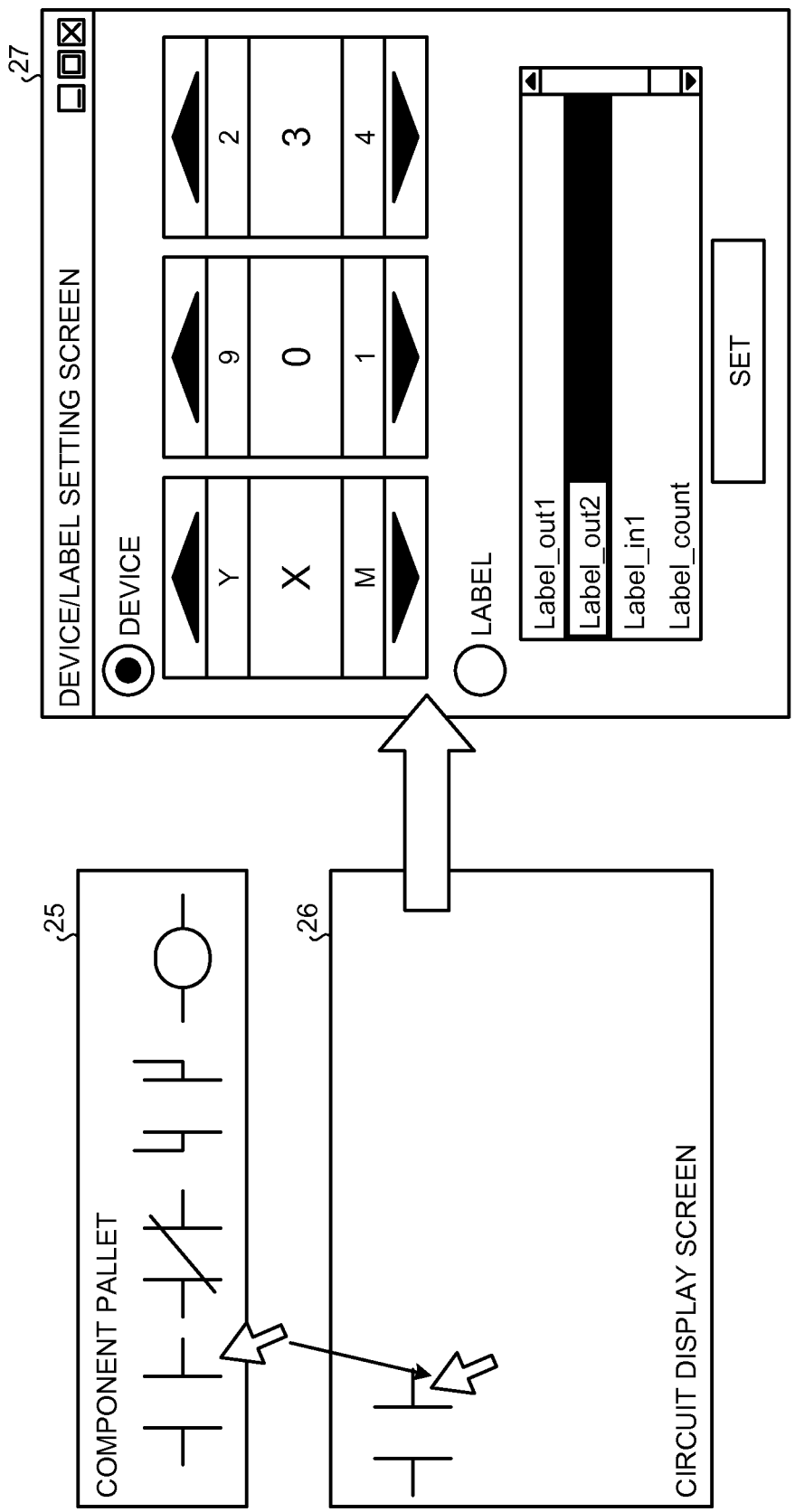
FIG. 6 is an explanatory diagram of an input support function.

FIG. 6 is an explanatory diagram of an input support function. The input support function for inputting information about a device and a label is described as an example. The display processing unit 3 displays a device/label setting screen 27 on the display device 12 for supporting inputs of information about a device and a label. For example, the device/label setting screen 27 is displayed as a dialogue on the mouse operation screen 21 for intermediate users.

On the mouse operation screen 21, for example, by dragging and dropping a component sign from a component pallet 25 to a circuit display screen 26, a component is pasted to the circuit display screen 26. When the component is pasted to the circuit display screen 26, the display processing unit 3 displays the device/label setting screen 27 as a dialogue. The device/label setting screen 27 accepts an input operation for setting a device and a label.

On the device/label setting screen 27, characters in a character string expressing a device can be changed one by one. Each of the characters is sequentially changed by clicking a button. After selecting "device" by a radio button, a user adjusts characters to a character string indicating a desired device by operating the button, and sets the device by clicking "set".

On the device/label setting screen 27, label names as candidates are displayed in a list. After selecting "label" by the radio button, the user selects a desired label from the candidates, and sets the selected label by clicking "set". Accordingly, the user can set a device and a label, not by inputting characters by the keyboard 15 or a soft keyboard on the screen. The device/label setting screen 27 can be applied to the touch-panel operation screen 22 for beginners.

FIG. 7 is a diagram for explaining about an operation support function. For example, on the mouse operation screen 21, if a user is unsure about an input operation, the user may move a mouse pointer on the screen without confirming the operation. For example, if the mouse pointer is moved for a period longer than a certain time without clicking by the mouse 14, the basic processing unit 2 instructs the display processing unit 3 to display an operation support screen 28. The basic processing unit 2 measures, for example, the time during which the mouse pointer is moving. The basic processing unit 2 instructs the display processing unit 3 to display the operation support screen 28 when a measurement result has exceeded a predetermined threshold.

The display processing unit 3 displays the operation support screen 28 on the display device 12 in response to an instruction from the basic processing unit 2. The operation support screen 28 is displayed as a dialogue, for example, when the UI for beginners is applied.

On the operation support screen 28, function names in program editing operation are presented, and a link to a dialogue that describes how to use the function is displayed for each function. Accordingly, if the user is unsure about an input operation, the user can continue the next operation by referring to the operation support screen 28 which is displayed automatically.

The engineering tool 1 may be arranged such that the UI can be set according to the user's skill level for each function of program editing. For example, the engineering tool 1 can set the UI mainly composed of the touch panel 13 for a monitor function, the UI mainly composed of the keyboard 15 for a circuit edit function, and the UI mainly composed of the mouse 14 for a PC parameter setting function. The basic processing unit 2 holds the UIs set for the respective functions in association with the functions.

In this example, if the user selects a monitor function in program editing, the engineering tool 1 reads the UI mainly composed of the touch panel 13 associated with the monitor function. If the user selects a circuit edit function, the engineering tool 1 reads the UI mainly composed of the keyboard 15 associated with the circuit edit function. If the user selects a PC parameter setting function, the engineering tool 1 reads out the UI mainly composed of the mouse 14.

In this manner, by enabling the UI to be set for each function, the user can freely customize an input operation method for each function, according to his skill for each function of program editing and the degree of his familiarity with each function.

The engineering tool 1 can be arranged in such a manner as to automatically store therein the UI settings for the entire program editing or for each function at an interval of a certain period. For example, if the program editing work is interrupted once and is resumed, the engineering tool 1 reads the UI stored therein. Accordingly, the user can store the UI setting in the engineering tool 1 without performing the operation to store the UI in the engineering tool 1 after once selecting the UI.

The engineering tool 1 can accumulate the UI setting as a history. For example, the user generates a log file that has recorded the UI setting history by an optional operation for log management. By specifying a restore point from the history, the engineering tool 1 reads the UI setting at the point in time of the restore point. Accordingly, the user can restore each of the UIs customized in the past.

It can also be arranged such that whether or not the UI setting is automatically stored can be switched by the user's setting operation. Accordingly, the user can freely select whether to store the UI setting for each function automatically.

The engineering tool 1 can be arranged so as to store the UI setting for each function, every time the program editing work is interrupted. Accordingly, the engineering tool 1 can hold the UI setting which has been set before the program editing work is interrupted, even after resuming the work.

Figure 8:
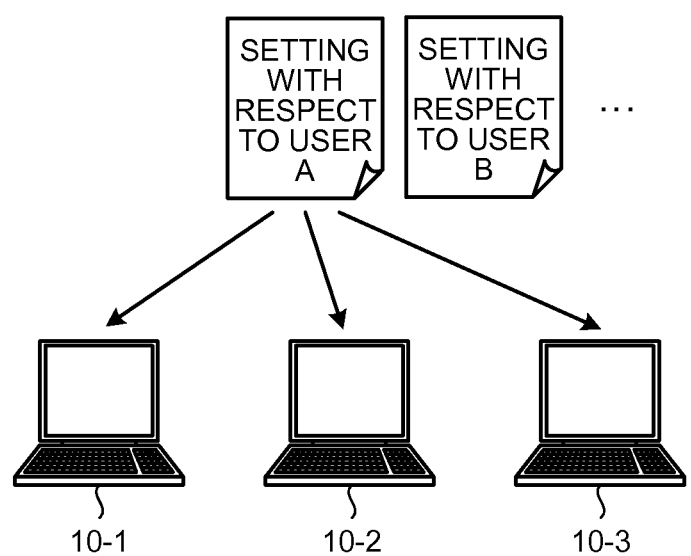
FIG. 8 is a diagram for explaining about sharing of the setting of a human interface among a plurality of engineering tools.

The UI setting according to the user's skill level can be shared between a plurality of engineering tools 1. FIG. 8 is a diagram for explaining about sharing of the setting of a human interface among a plurality of engineering tools.

For example, it is assumed that three PCs 10-1, 10-2, and 10-3 are connected communicably to one another via a cable or the like. The engineering tools 1 are respectively installed in the PCs 10-1, 10-2, and 10-3. Either one of the three PCs 10-1, 10-2, and 10-3 holds the UI setting for each user.

For example, it is assumed that the engineering tool 1 of the PC 10-1 holds the setting for a user A, the setting for a user B, and so on. In this case, when the user A performs program edition by using the engineering tool 1 of the PC 10-2, the engineering tool 1 of the PC 10-2 reads the UI setting for the user A from the engineering tool 1 of the PC 10-1 via communication.

In this manner, when a user performs program editing by using any one of the three PCs 10-1, 10-2, and 10-3, the engineering tool 1 reads the common UI set for the user. In the work by using any one of the three PCs 10-1, 10-2, and 10-3, the users can perform an input operation in the UI according to his own skill level.

The engineering tools 1 installed in the three PCs 10-1, 10-2, and 10-3 can be the same products, or at least one of the engineering tools 1 can be a different product. Not only when the engineering tools 1 are the same products but also when the engineering tools 1 are mutually different products, the UI setting can be shared. Accordingly, the user can save the time for setting the UI for each product of the engineering tool 1. Here, the "different product" includes a case in which either one of a product series and a product version is different.

Figure 9:
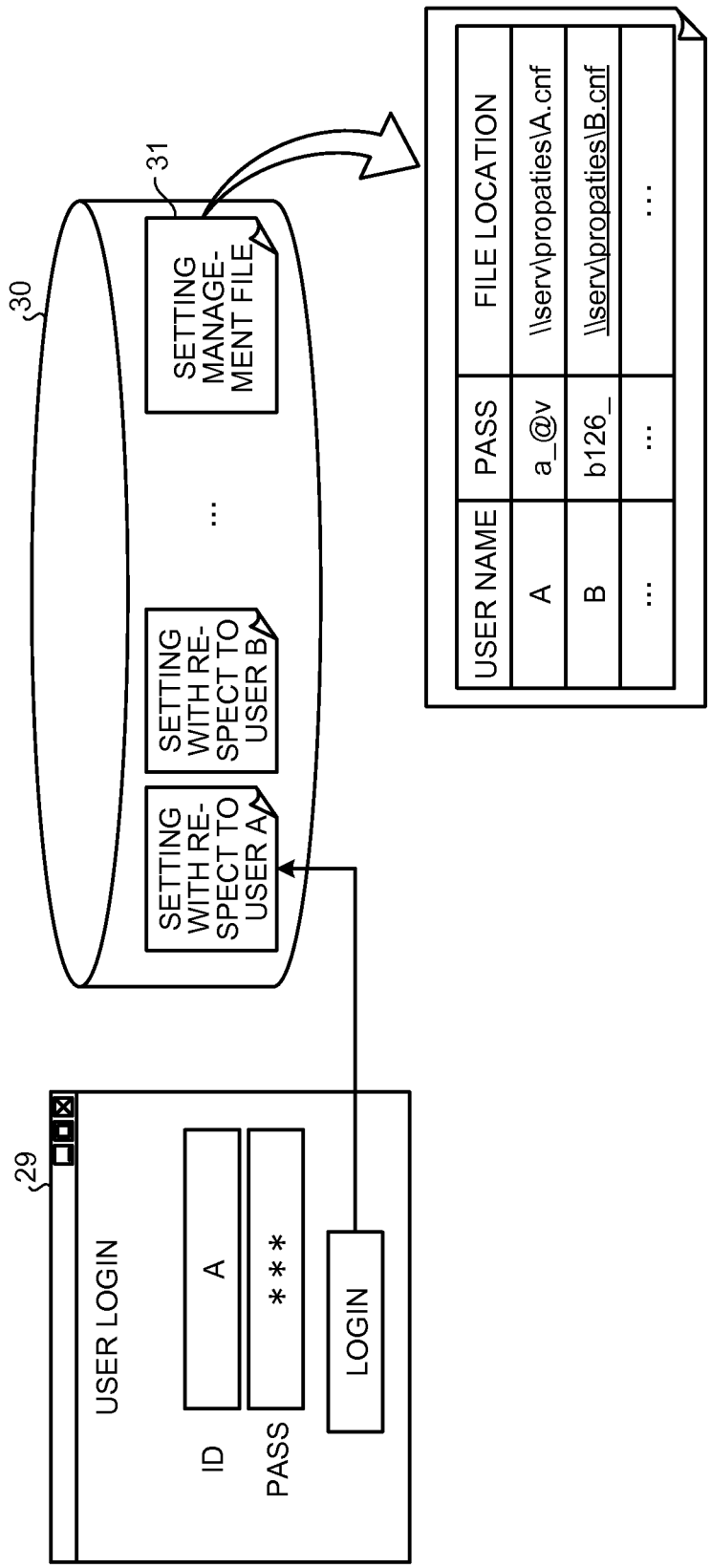
FIG. 9 is a diagram for explaining about management of the setting of a human interface for each user.

FIG. 9 is a diagram for explaining about management of the setting of a human interface for each user. The engineering tool 1 that holds the UI setting in a storage area 30 manages content of the UI setting as a file in units of users. The engineering tool 1 that holds the UI setting holds a setting management file 31 in the storage area 30. In the setting management file 31, an address of a file location in the storage area 30 where the file for each user is stored is stored in association with a user name and a password, which is authentication information.

For example, it is assumed that the user A logs in when starting a program edition in the engineering tool 1 of the PC 10-2. The user A inputs his own user name (ID) "A" and the password "a_@v" on a login screen 29 displayed on the display device 12.

It is assumed that the UI setting and the setting management file 31 are held in the storage area 30 of the engineering tool 1 of the PC 10-1. When the user A presses a login button on the login screen 29 to execute login, the engineering tool 1 of the PC 10-2 accesses the setting management file 31 in the engineering tool 1 of the PC 10-1.

The engineering tool 1 of the PC 10-2 acquires an address "¥¥serv¥propaties¥A.cnf" of the file location corresponding to the user name "A" and the password "a_@v" from the setting management file 31. The engineering tool 1 of the PC 10-2 reads the setting information of the user A stored in the acquired address from the storage area 30.

Accordingly, the engineering tool 1 accepts user authentication, and can read the UI setting for each user. The engineering tool 1 manages the UI setting of each user together with the authentication information, and can increase robustness of security by enabling the UI setting to be read according to the input of the authentication information.

For example, it is assumed that the UI for the user B is set as default in the engineering tool 1 of the PC 10-2. When the user A uses the engineering tool 1 of the PC 10-2 for program editing, the engineering tool 1 of the PC 10-2 can read and set the UI for the user A. In this case, it can be set such that, after the user A finishes program edition by using the engineering tool 1 of the PC 10-2, the engineering tool 1 of the PC 10-2 can automatically restore the setting to the UI for the original user B. Accordingly, the engineering tool 1 can easily restore the UI setting to the original setting, if the UI setting is temporarily changed from default.

Figure 10:
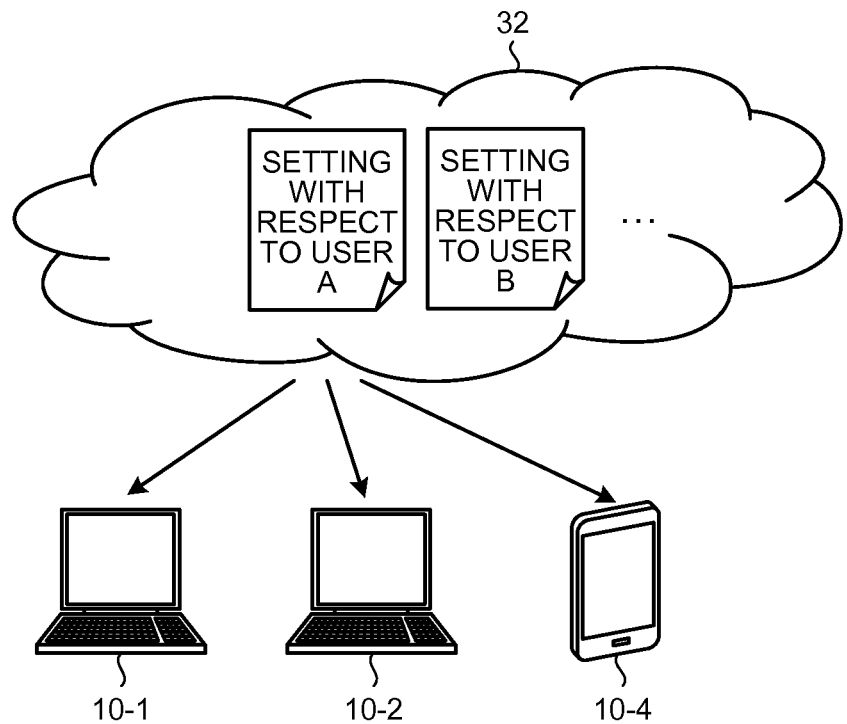
FIG. 10 is a diagram for explaining about sharing of the setting of a human interface via a network in the engineering tools.

The plurality of engineering tools 1 can share the UI setting according to the user's skill level via a network. FIG. 10 is a diagram for explaining about sharing of the setting of a human interface via a network in the engineering tools. The UI setting is stored in any one of the hardware elements connected to a network 32 such as the Internet. The engineering tools 1 of the respective hardware elements connected to the network 32 constitute an engineering system.

The engineering tools 1 are installed respectively in the PCs 10-1, 10-2, and a mobile terminal 10-4 connectable to the network 32. For example, the engineering tool 1 reads the UI setting together with user authentication. A user can read his own UI setting via the network 32 from any one of the engineering tools 1.

Accordingly, the engineering tool 1 can provide the UI setting of each user to any hardware connectable to the network 32. Not only when the engineering tools 1 are the same products but also when the engineering tools 1 are mutually different products, the UI setting can be shared through the network 32.

Figure 11:
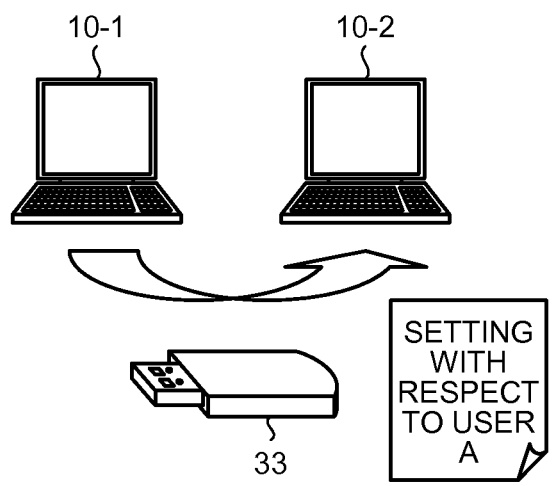
FIG. 11 is a diagram for explaining about sharing of the setting of a human interface via an external recording medium in the engineering tools.

The engineering tools 1 can be arranged to share the UI setting according to the user's skill level via a computer readable external recording medium. FIG. 11 is a diagram for explaining about the sharing of setting of a human interface via an external recording medium in the engineering tools.

An USB memory 33 that is an external recording medium holds the UI setting. The engineering tools 1 are respectively installed in the PCs 10-1 and 10-2, to which the USB memory 33 can be connected. When the USB memory 33 is connected to the PCs 10-1 and 10-2, the engineering tool 1 reads the UI setting from the USB memory 33.

When performing program editing by using any one of the PCs 10-1 and 10-2, a user can read his own UI setting by connecting the USB memory 33 to the PCs 10-1 and 10-2. Accordingly, the engineering tool 1 can share the UI setting of each user between the hardware elements not connected directly to each other communicably.

The engineering tool 1 is not limited to the one that uses the USB memory 33 for sharing the UI setting, but can use any external recording medium. It can be set such that, after the external recording medium is connected to the hardware, the engineering tool 1 reads the UI setting from the external recording medium, only when user authentication is performed. Accordingly, when the external recording medium holds the UI setting of a plurality of users, the engineering tool 1 can read the UI setting of each user. The engineering tool 1 can increase robustness of security by managing the UI setting of each user together with the authentication information and by enabling the UI setting to be read according to the input of the authentication information.

Not only when the engineering tools 1 are the same products but also when the engineering tools 1 are mutually different products, the UI setting can be shared through the external recording medium.

According to the engineering tool 1 of the present invention, a user can set a UI arbitrarily according to the level of his own operation skill from a plurality of UIs that the engineering tool 1 can provide. For example, the engineering tool 1 can provide a UI that enables an easy and understandable input operation for users with a beginner level. The engineering tool 1 can also provide an UI suitable for an advanced editing work focusing on working speed with respect to users skilled in program editing. Accordingly, the engineering tool 1 can satisfy both understandability and high operability according to the level of the user's operation skill for users having different level of operation skills.

REFERENCE SIGNS LIST

1 engineering tool, 2 basic processing unit, 3 display processing unit, 10 PC, 11 input device, 12 display device, 13 touch panel, 14 mouse, 15 keyboard, 21 mouse operation screen, 22 touch-panel operation screen, 23 tab, 24 tile menu, 25 component pallet, 26 circuit display screen, 27 device/label setting screen, 28 operation support screen, 29 login screen, 30 storage area, 31 setting management file, 32 network, 33 USB memory.

The invention claimed is:
1. An engineering tool comprising:
a basic processing unit that performs a process of program editing according to an input operation by an input device; and
a display processing unit that displays an operation screen for the program editing on a display device, wherein
the basic processing unit can accept the input operation by a plurality of input devices respectively corresponding to human interfaces for each of a beginner level, an intermediate level and an advanced level,
the engineering tool sets a main component for each of the human interfaces, the main component being one of the input devices, and
when any one of the human interfaces for the beginner level, the intermediate level, and the advanced level is selected according to a level of operation skill in the input operation, the basic processing unit performs a process in accordance with the input operation by an input device corresponding to the selected human interface, and the display processing unit displays the operation screen corresponding to the selected human interface on the display device, and wherein
a particular human interface among the human interfaces is selected for each function of the program editing, and
the basic processing unit stores the particular human interface selected for each function of the program editing in response to the function of the program editing being interrupted and holds the particular human interface selected for each function of the program editing in association with the function of the program editing.
2. The engineering tool according to claim 1, wherein the display processing unit displays a selection screen for accepting a selection of the human interface on the display unit.
3. The engineering tool according to claim 1, wherein when the basic processing unit detects that any one of the input devices is connected to hardware, the human interface is switched over according to the connected input device.
4. The engineering tool according to claim 3, wherein the engineering tool stores a setting of the human interface at an interval of a certain period.
5. The engineering tool according to claim 4, wherein the engineering tool shares a setting of the human interface among a plurality of engineering tools.
6. The engineering tool according to claim 5, wherein the engineering tool holds the setting of the human interface together with authentication information of a user, and in response to an input of the authentication information, the engineering tool reads the setting of the human interface corresponding to the input authentication information.
7. The engineering tool according to claim 5, wherein a plurality of hardware elements installed with the engineering tool are mutually connected via a network, and any of the hardware elements connected to the network holds the setting of the human interface.
8. The engineering tool according to claim 5, wherein the engineering tool shares the setting of the human interface via an external recording medium among the engineering tools.
9. The engineering tool according to claim 1, wherein the plurality of input devices includes a touch panel, a mouse, and a keyboard.

* * * * *